US009831594B2

(12) United States Patent
Kurita (10) Patent No.: US 9,831,594 B2
(45) Date of Patent: Nov. 28, 2017

(54) ELECTRIC POWER SUPPLY CONNECTOR FOR VEHICLE WITH A SEAL TO PREVENT INTRUSION OF WATER BETWEEN A BODY AND A COVER OF THE CONNECTOR

(71) Applicant: Sumitomo Wiring Systems, Ltd., Yokkaichi, Mie (JP)

(72) Inventor: Atsushi Kurita, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/502,589

(22) PCT Filed: Aug. 19, 2015

(86) PCT No.: PCT/JP2015/073188
§ 371 (c)(1),
(2) Date: Feb. 8, 2017

(87) PCT Pub. No.: WO2016/035547
PCT Pub. Date: Mar. 10, 2016

(65) Prior Publication Data
US 2017/0229804 A1    Aug. 10, 2017

(30) Foreign Application Priority Data

Sep. 2, 2014   (JP) ................................. 2014-177839

(51) Int. Cl.
*H01R 13/52*   (2006.01)
*H01R 24/28*   (2011.01)
(Continued)

(52) U.S. Cl.
CPC ...... *H01R 13/5202* (2013.01); *B60L 11/1818* (2013.01); *H01R 13/5213* (2013.01);
(Continued)

(58) Field of Classification Search
CPC ............. H01R 13/5202; H01R 13/521; H01R 13/5213; H01R 13/5219; H01R 24/28
(Continued)

(56) References Cited

U.S. PATENT DOCUMENTS 5,947,766 A * 9/1999 Tsuji .................... H01R 13/748
                                                         439/559
8,662,910 B2 * 3/2014 Ichio .................. H01R 13/5208
                                                         439/206
(Continued)

FOREIGN PATENT DOCUMENTS

JP    2012-221613    11/2012
JP    2012-243467    12/2012
(Continued)

OTHER PUBLICATIONS

International Search Report dated Nov. 2, 2015.

*Primary Examiner* — Chandrika Prasad
(74) *Attorney, Agent, or Firm* — Gerald E. Hespos; Michael J. Porco; Matthew T. Hespos (57) ABSTRACT

An electric power supply connector for vehicle (10) is provided with an inlet body (20) including a connector fitting portion (21) into which a mating connector can fit. Tubular components made of metal are fixed around the connector fitting portion (21) with one end part (26A) of each tubular component projecting more than another end part (26B). A cover (30) with insertion holes (33) into which the tubular components are to be inserted is fixed to the inlet body (20) with the one end part (26A) projecting from an opening of each insertion hole (33). A seal (40) is configured to seal between the inlet body (20) and the cover (30) by being held in close contact with peripheral edges (27) of the tubular components in the inlet body (20) and edges (37) of the insertion holes (33).

3 Claims, 6 Drawing Sheets

(51) Int. Cl.
    *B60L 11/18*     (2006.01)
    *H01R 107/00*     (2006.01)

(52) U.S. Cl.
    CPC ......... *H01R 13/5219* (2013.01); *H01R 24/28* (2013.01); *H01R 2107/00* (2013.01); *H01R 2201/26* (2013.01)

(58) Field of Classification Search
    USPC .................. 439/271, 272, 559, 587, 682
    See application file for complete search history.

(56) References Cited

U.S. PATENT DOCUMENTS

| | | | |
|---|---|---|---|
| 8,740,632 B2 * | 6/2014 | Osawa | H01R 13/50 439/76.2 |
| 9,352,660 B2 * | 5/2016 | Osawa | B60L 11/1818 |
| 9,463,702 B2 * | 10/2016 | Fukushima | H01R 13/506 |
| 9,472,882 B2 * | 10/2016 | Kurita | H01R 13/424 |
| 9,478,899 B2 * | 10/2016 | Kurita | H01R 13/5227 |
| 9,478,921 B2 * | 10/2016 | Osawa | H01R 13/748 |
| 2012/0258635 A1 | 10/2012 | Osawa | |
| 2012/0295460 A1 | 11/2012 | Ichio et al. | |
| 2014/0127924 A1 | 5/2014 | Kim | |

FOREIGN PATENT DOCUMENTS

| | | |
|---|---|---|
| JP | 2014-130749 | 7/2014 |
| JP | 2014-519685 | 8/2014 |

\* cited by examiner

ELECTRIC POWER SUPPLY CONNECTOR FOR VEHICLE WITH A SEAL TO PREVENT INTRUSION OF WATER BETWEEN A BODY AND A COVER OF THE CONNECTOR

BACKGROUND

1. Field of the Invention

A technique disclosed by this specification relates to an electric power supply connector for vehicle.

2. Description of the Related Art

An electric vehicle or plug-in hybrid vehicle charges a battery of the vehicle by connecting a charging connector from a power supply to an electric power supply connector that is connected to the battery of the vehicle. Japanese Unexamined Patent Publication No. 2012-243467 discloses a known electric power supply connector for vehicle. A housing of this vehicle-side connector includes a mounting plate to be bolted to an outer panel and an inner tube portion for accommodating a terminal fitting while penetrating through the mounting plate. Collars made of metal are press-fit at four corners of the mounting plate and the housing is bolted to the outer panel by inserting bolts into the collars.

In a connector like the above-described vehicle-side connector, a cover may be fixed to provide a display unit or the like or to improve designability. To bolt this cover to a body, relatively long collars are, for example, press-fit into the mounting plate and the cover is provided with passage holes allowing the passage of the collars. In fixing the cover member and a housing, one bolt is inserted through each collar and fastened to the body.

If the electric power supply connector for vehicle is exposed to the outside of the vehicle and water intrudes from the outside of the vehicle during charging, water may intrude through clearances between the outer peripheral surfaces of the collars and the inner peripheral surfaces of the passage holes. Water that has intruded may leak through a clearance between a surface of the mounting plate and a back surface of the cover and intrude to the back surface of the cover and into the body.

SUMMARY

An electric power supply connector for a vehicle disclosed by this specification is provided with an inlet body including a connector fitting portion, into which a mating connector is fittable, and a tubular component made of metal. The tubular component has a tubular shape and is fixed around the connector fitting portion with one end part of the tubular component projecting more than another end part. The electric power supply connector further has a cover including an insertion hole, into which the tubular component is to be inserted. The cover is to be fixed to the inlet body with the one end part projecting from an opening of the insertion hole. A seal is configured to seal between the inlet body and the cover by being held in close contact with a peripheral edge part of the tubular component in the inlet body and an edge part of the insertion hole.

According to this configuration, water that has intruded between the outer peripheral surface of the tubular component and the inner peripheral surface of the insertion hole will not intrude to a back side of the cover member and into a body by holding the seal in close contact with the peripheral edge part of the tubular component in the inlet body and the edge part of the insertion hole. In other words, sealing can be established at a location where a metal component, such as the tubular component, extends across between members.

The seal may be provided with a passage hole through which the tubular component is passable, and lips may be provided respectively on both surfaces of an edge part of the passage hole. According to this configuration, the respective lips are squeezed by the peripheral edge part of the tubular component in the inlet body and the edge part of the insertion hole so that reliable sealing can be provided.

A front frame body may be provided in the cover and may have the insertion hole arranged therein. A rear frame body may be provided in the inlet body and may have the tubular component arranged therein. The seal member may be sandwiched between the front frame body and the rear frame body. According to this configuration, water intrusion between the front frame body and the rear frame body can be prevented. Thus, the seal member will not be degraded, such as due to the corrosion of water having intruded between the front frame body and the rear frame body.

According to the electric power supply connector for vehicle disclosed by this specification, sealing can be established at a location where a metal component such as the tubular components extends across between members.

DETAILED DESCRIPTION

An embodiment is described with reference to FIGS. 1 to 6. An electric power supply connector for vehicle 10 in this embodiment includes an inlet body 20 shown in FIG. 6 and a cover member 30 shown in FIG. 5. The inlet body 20 includes a connector fitting portion 21 to which a charging gun provided on an unillustrated power feeder side is connectable. This electric power supply connector for vehicle 10 is fixed to a body B of a vehicle. Note that, in the following description, a side of the connector fitting portion 21 to be connected to the charging gun is referred to as a front side.

The connector fitting portion 21 includes accommodating tubes 21A into which unillustrated terminals are to be accommodated, respectively, and a hollow cylindrical terminal receptacle 21B is provided to collectively surround these accommodating tubes 21A. When the charging gun is fit into the terminal receptacle 21B, each terminal of the charging gun is held connected to the terminal in the corresponding accommodating tube 21A. A substantially U-shaped lock receptacle 21C projects up on the upper surface of the terminal receptacle 21B. Note that the terminal receptacle 21B and the lock receptacle 21C are collectively referred to as receptacles 21B, 21C below.

Figure 6:
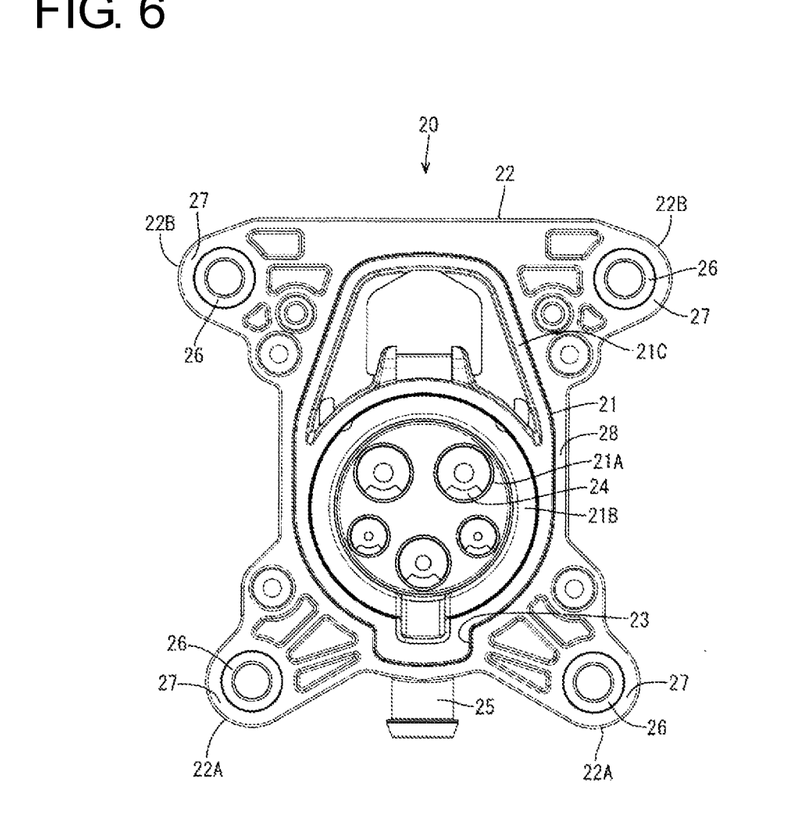
FIG. 6 is a front view of an inlet body.

As shown in FIG. 6, the inlet body 20 includes a rear frame body 22 arranged around the receptacles 21B, 21C. This rear frame body 22 protrudes toward an outer peripheral side with the connector fitting portion 21 as a center and has left and right flanges 22A protruding obliquely down from the terminal receptacle 21B and left and right flanges 22B protruding toward both left and right sides from the lock receptacle 21C.

A positioning recess 23 projects down in a lower end part of the terminal receptacle 21B. An unillustrated positioning projection provided on a lower end part of the charging gun is fit into this positioning recess 23 so that the charging gun can be positioned in a correct connection posture.

Figure 1:
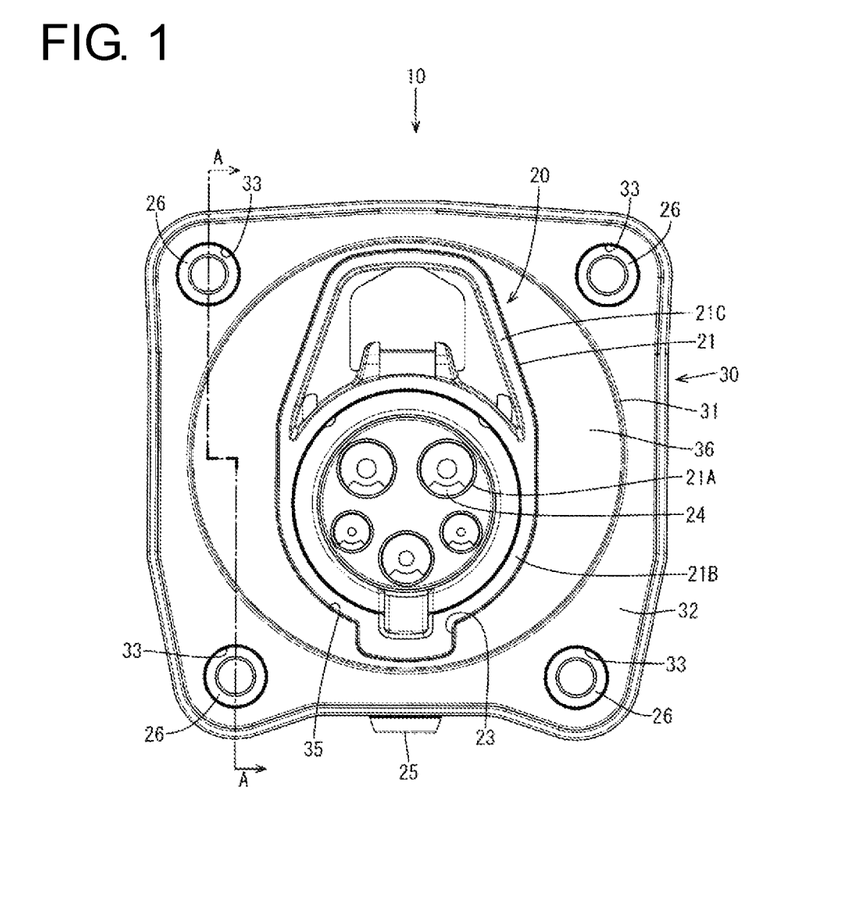
FIG. 1 is a front view of an electric power supply connector for vehicle.
Figure 2:
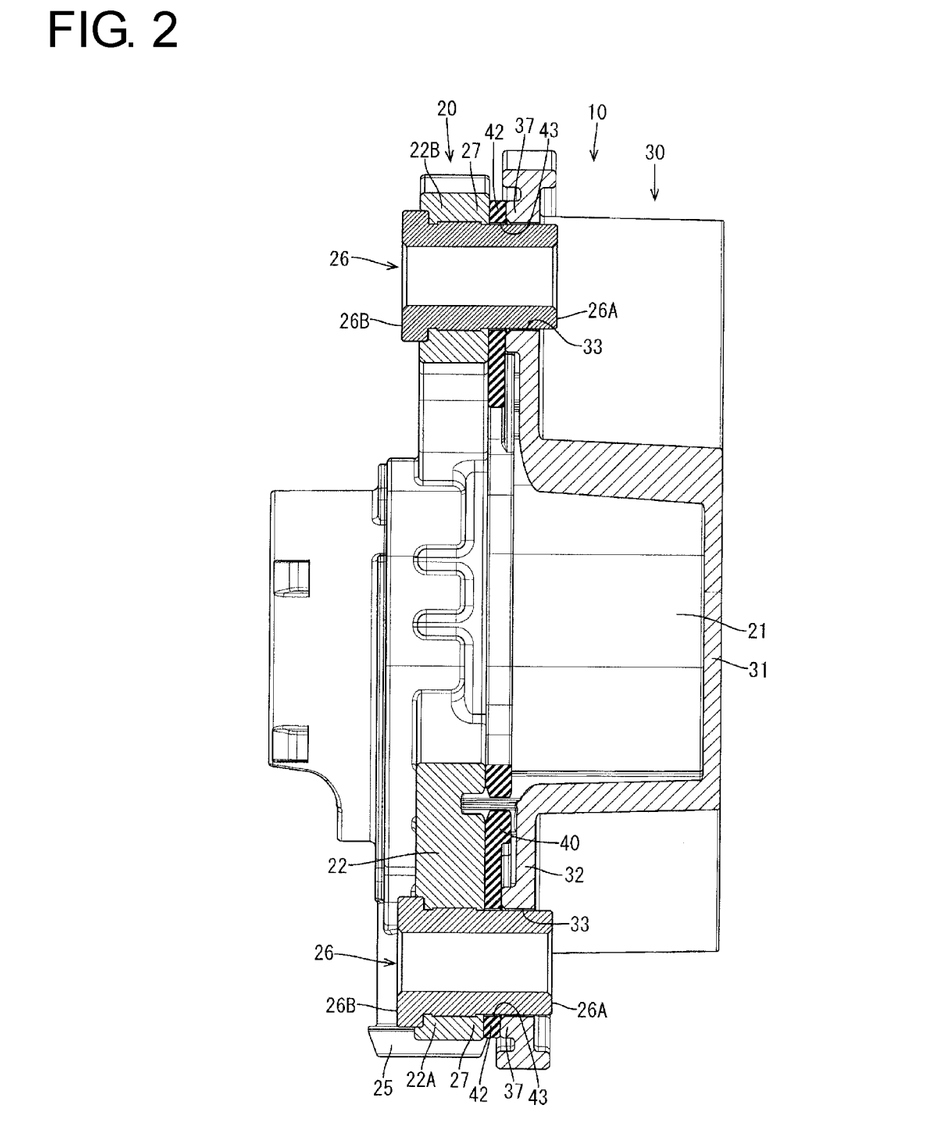
FIG. 2 is a section along A-A in FIG. 1.

As shown in FIG. 2, a hollow cylindrical drain pipe 24 is provided in a rear end part of the positioning recess 23. This drain pipe 24 communicates with the inside of the connector fitting portion 21 and water that may have intruded into the accommodating tubes 21A from the front (design surface side) of the electric power supply connector for vehicle 10 is fed into the drain pipe 25 from water drainage holes 24 (see FIG. 1) provided in lower parts of the rear ends of the accommodating tubes 21A. The water in the drain pipe 25 is fed down and drained to the outside of the electric power supply connector for vehicle 10.

Figure 3:
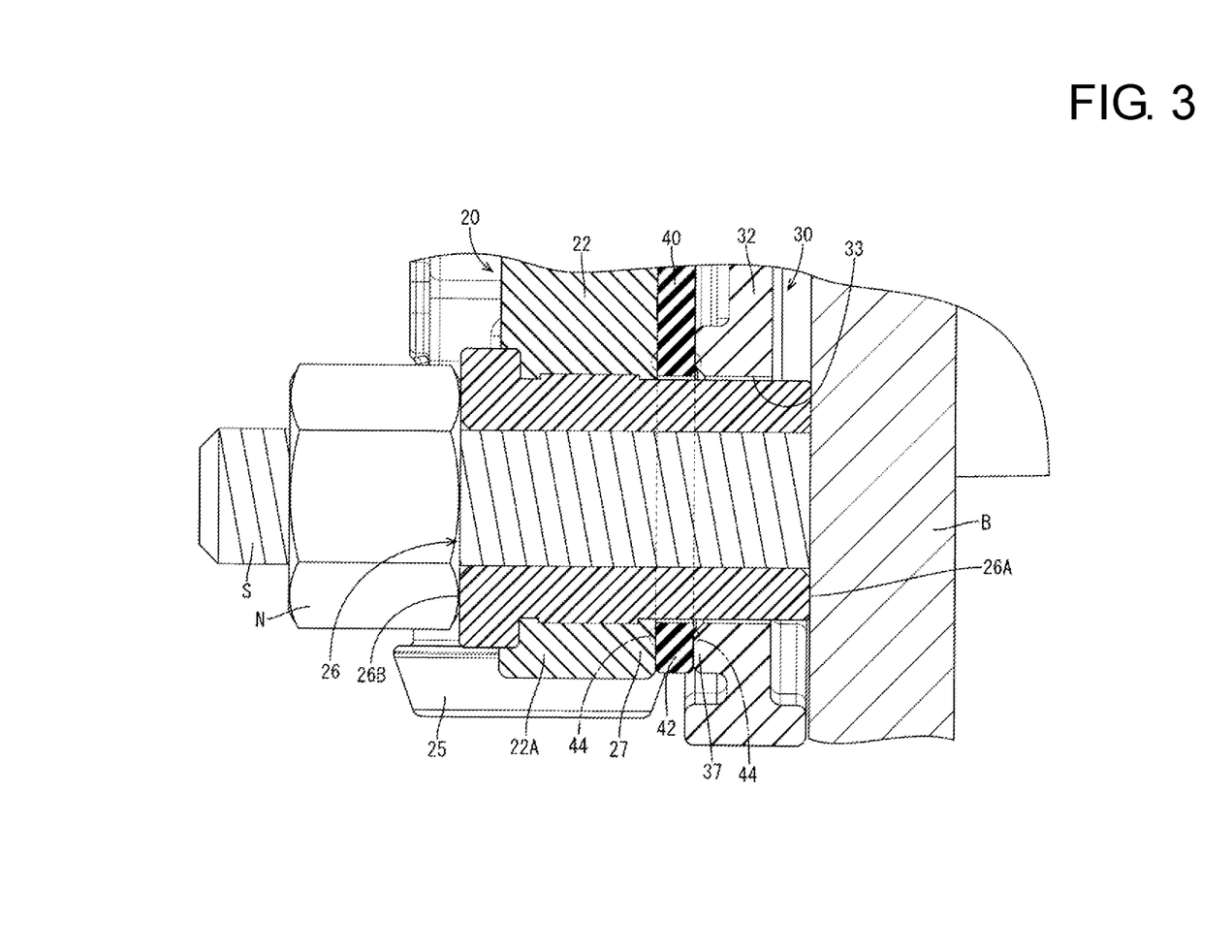
FIG. 3 is an enlarged section of an essential part of FIG. 2.
Figure 4:
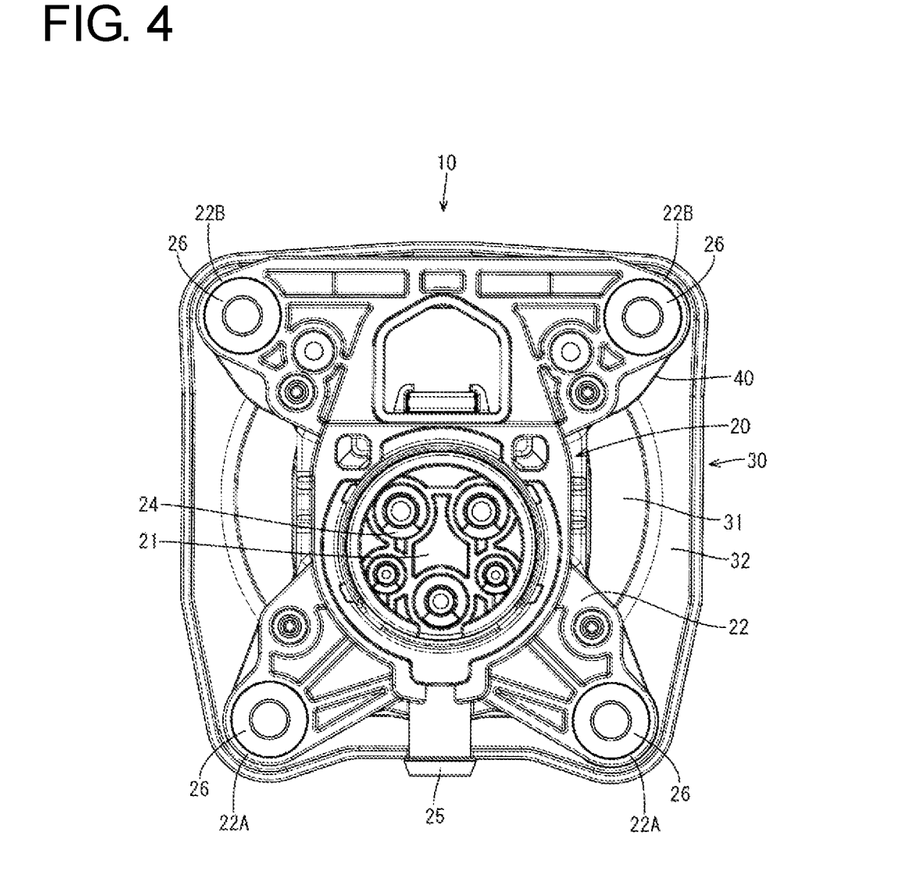
FIG. 4 is a back view of the electric power supply connector for vehicle.

As shown in FIG. 3, the cover 30 includes a substantially circular cover body 31 and a front frame body 32 protruding toward an outer peripheral side of the cover body 31. The cover body 31 is provided with a mounting hole 35 into which the receptacles 21B, 21C are to be fit. Further, as shown in FIG. 5, fixing nuts 34 for fixing the inlet body 20 to the cover 30 are fixed to a peripheral edge part of the mounting hole 35 by fixing means, such as press-fitting.

Figure 5:
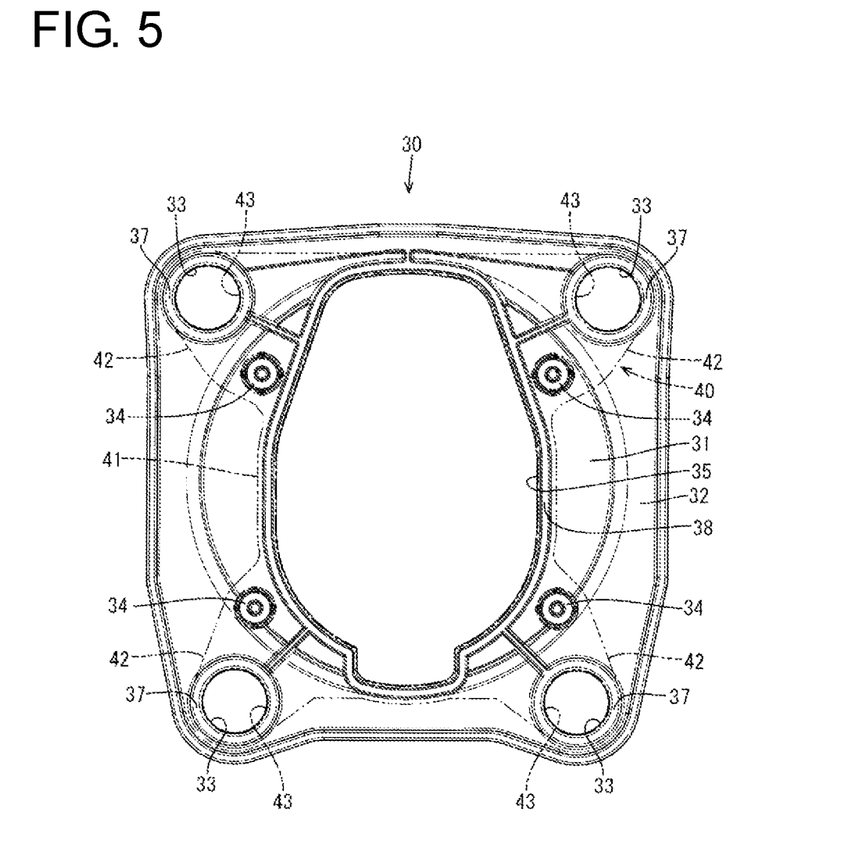
FIG. 5 is a back view of a cover member.

As shown in FIG. 5, the front frame body 32 has a substantially square outer peripheral shape as a whole. Insertion holes 33 are provided to penetrate in a plate thickness direction at four corners of the front frame body 32. As shown in FIG. 1, long collars 26 are inserted into the insertion holes 33 from behind when mounting the cover 30 on the inlet body 20 from the front.

On the other hand, as shown in FIG. 6, the hollow cylindrical long collars 26 made of metal are fixed respectively to the respective flanges 22A, 22B of the rear frame body 22 by insert molding. As shown in FIG. 2, the long collars 26 penetrate through the rear frame body 22 in a front-rear direction, rear end parts 26B thereof slightly project rearward from a rear end opening of the rear frame body 22, and front end parts 26A thereof project a relatively large amount forward from a front end opening of the rear frame body 22. Specifically, a projecting height of the front end parts 26A of the long collars 26 is larger than that of the rear end parts 26B. This causes the cover 30 to be fixed to the inlet body 20 in a state where the front end parts 26A of the long collars 26 project forward from front end openings of the insertion holes 33 to contact the body B, and the rear end parts 26B of the long collars 26 are in contact with nuts N (i.e. in a metal-touch state), as shown in FIG. 3. In other words, the inlet body 20 and the body B are fixed by metal touch by passing stud bolts S provided on the body B in advance through the long collars 26 from the front and fastening the nuts N to the stud bolts S.

In the electric power supply connector for vehicle 10 of this embodiment, water intrusion into the body B through the connector fitting portion 21 is prevented by a seal 40 arranged between the inlet body 20 and the cover member 30, but water may intrude into clearances between the outer peripheral surfaces of the long collars 26 and the inner peripheral surfaces of the insertion holes 33. Even if this water does not intrude into the body B, it is not preferable in charging that the water intrudes to the back surface of the cover 30.

Accordingly, in this embodiment, second seal portions 42 are sandwiched between peripheral edges 27 of the long collars 26 in the rear frame body 22 and edges 37 of the insertion holes 33 in the front frame body 32, as shown in FIG. 3. On the other hand, a first seal portion 41 is sandwiched between peripheral edges 28 of the receptacles 21B, 21C in the rear frame body 22 and an edge 38 of the mounting hole 35 in the front frame body 32. As shown in FIG. 5, the first seal 41 and a plurality of second seal portions 42 are coupled integrally and the single seal 40 is constituted by these seal portions 41, 42.

Further, as shown in FIG. 3, the seal portion 42 is provided with a passage hole 43 through which the long collar 26 is passed, and lips 44 are provided respectively on both front and rear surfaces of an edge of the passage hole 43. Although the lips 44 before being squeezed are shown by chain line in FIG. 3, the respective lips 44 actually are squeezed by the peripheral edge 27 of the long collar 26 and the edge 37 of the insertion hole 33. In this way, water that has intruded between the outer peripheral surface of the long collar 26 and the inner peripheral surface of the insertion hole 33 is stopped by the respective lips 44 of the second seal portion 42 and water intrusion between the front frame body 32 and the rear frame body 22 can be avoided. As a result, there is no likelihood that the seal 40 is degraded by water pooled between the front frame body 32 and the rear frame body 22.

This embodiment is configured as described above. Next, functions of this embodiment are described. First, if water splashes into the receptacles 21B, 21C from the front (design surface side) of the electric power supply connector for vehicle 10, the water that has intruded into the accommodating tubes 21A is drained to the outside of the electric power supply connector for vehicle 10 from the drain pipe 25 through the water drainage holes 24. On the other hand, the water that has intruded into the accommodating tubes 21A is drained to the outside of the electric power supply connector for vehicle 10 from the positioning recess 23 through the drain pipe 25.

Next, the water that has intruded between the outer peripheral surfaces of the long collars 26 and the inner peripheral surfaces of the insertion holes 33 is stopped by the second seal portions 42 and does not intrude between the front frame body 32 and the rear frame body 22. Thus, there is no likelihood of water intrusion to the rear surface of the rear frame body 22 and into the body B.

As described above, in this embodiment, it is possible to avoid the intrusion of water that has intruded between the outer peripheral surfaces of the tubular components (long collars 26) in the inlet body 20 and the inner peripheral surfaces of the insertion holes 33 to the back side of the cover 30 and into the body B by holding the seal 40 in close contact with the peripheral edges 27 of the tubular components and the edges 37 of the insertion holes 33. In other words, sealability at locations where metal components such as the tubular components extend across between members can be established.

The seal 40 may be provided with the passage holes 43 through which the tubular components are passable, and the lips 44 may be provided respectively on both surfaces of the edges of these passage holes 43. According to this configuration, the respective lips 44 are squeezed by the peripheral edges 27 of the tubular components in the inlet body 20 and the edges 37 of the insertion holes 33 so that reliable sealing can be provided.

The front frame body 32 provided in the cover 30 and having the insertion holes 33 arranged therein and the rear frame body 22 provided in the inlet body 20 and having the tubular components arranged therein may be provided, and the seal 40 may be sandwiched between the front frame body 32 and the rear frame body 22. According to this configuration, water intrusion between the front frame body 32 and the rear frame body 22 can be prevented. Thus, the seal 40 will not be degraded such as due to the corrosion of water that has intruded between the front frame body 32 and the rear frame body 22.

The technique disclosed by this specification is not limited to the above described and illustrated embodiment. For example, the following various modes are also included.

Although the body B is in contact with the front end parts 26A of the long collars 26 in the above embodiment, the body B may be in contact with the rear end parts 26B of the long collars 26.

Although the seal 40 is provided with the lips 44 in the above embodiment, the seal may not include lips.

Although the front frame body 32 is provided with the insertion holes 33 in the above embodiment, a display unit may be provided with insertion holes. Similarly, although the rear frame body 22 is provided with the long collars 26 in the above embodiment, long collars may be provided along the outer peripheral surfaces of the receptacles 21B, 21C.

LIST OF REFERENCE SIGNS

10 . . . electric power supply connector for vehicle
20 . . . inlet body
21 . . . connector fitting portion
22 . . . rear frame body
26 . . . long collar (tubular component)
26A . . . front end part (one end part)
26B . . . rear end part (other end part)
27 . . . peripheral edge part (of long collar in rear frame body)
30 . . . cover
32 . . . front frame body
33 . . . insertion hole
37 . . . hole edge part (of insertion hole)
40 . . . seal
44 . . . lip

The invention claimed is:

1. An electric power supply connector for vehicle, comprising:
    an inlet body including opposite front and rear surfaces and a connector fitting portion at the front surface into which a mating connector is fittable, and a tubular component made of metal, having a tubular shape with opposite front and rear ends, the tubular component being fixed to the inlet body outward of the connector fitting portion with the front end of the tubular component projecting from the front surface of the inlet body by a projecting distance that is more than a projecting distance of the rear end of the tubular component from the rear surface of the inlet body;
    a cover fixed to the front surface of the inlet body and including an insertion hole through which the front end of the tubular component is inserted so that the front end of the tubular component is projecting from an opening of the insertion hole; and
    a seal configured to seal between the inlet body and the cover by being held in close contact with both a peripheral edge part of the tubular component in the inlet body and an edge of the insertion hole.

2. The electric power supply connector for vehicle of claim 1, wherein the seal is provided with a passage hole through which the tubular component is passable, and lips are provided respectively on both surfaces of an edge of the passage hole.

3. The electric power supply connector for vehicle of claim 1, further comprising:
    a front frame body provided in the cover and having the insertion hole arranged therein; and
    a rear frame body provided in the inlet body and having the tubular component arranged therein,
    wherein the seal is sandwiched between the front frame body and the rear frame body.

* * * * *